March 27, 1934.  A. MARCH ET AL  1,952,270
WOOD SAWING MACHINERY
Filed July 11, 1933   3 Sheets-Sheet 1
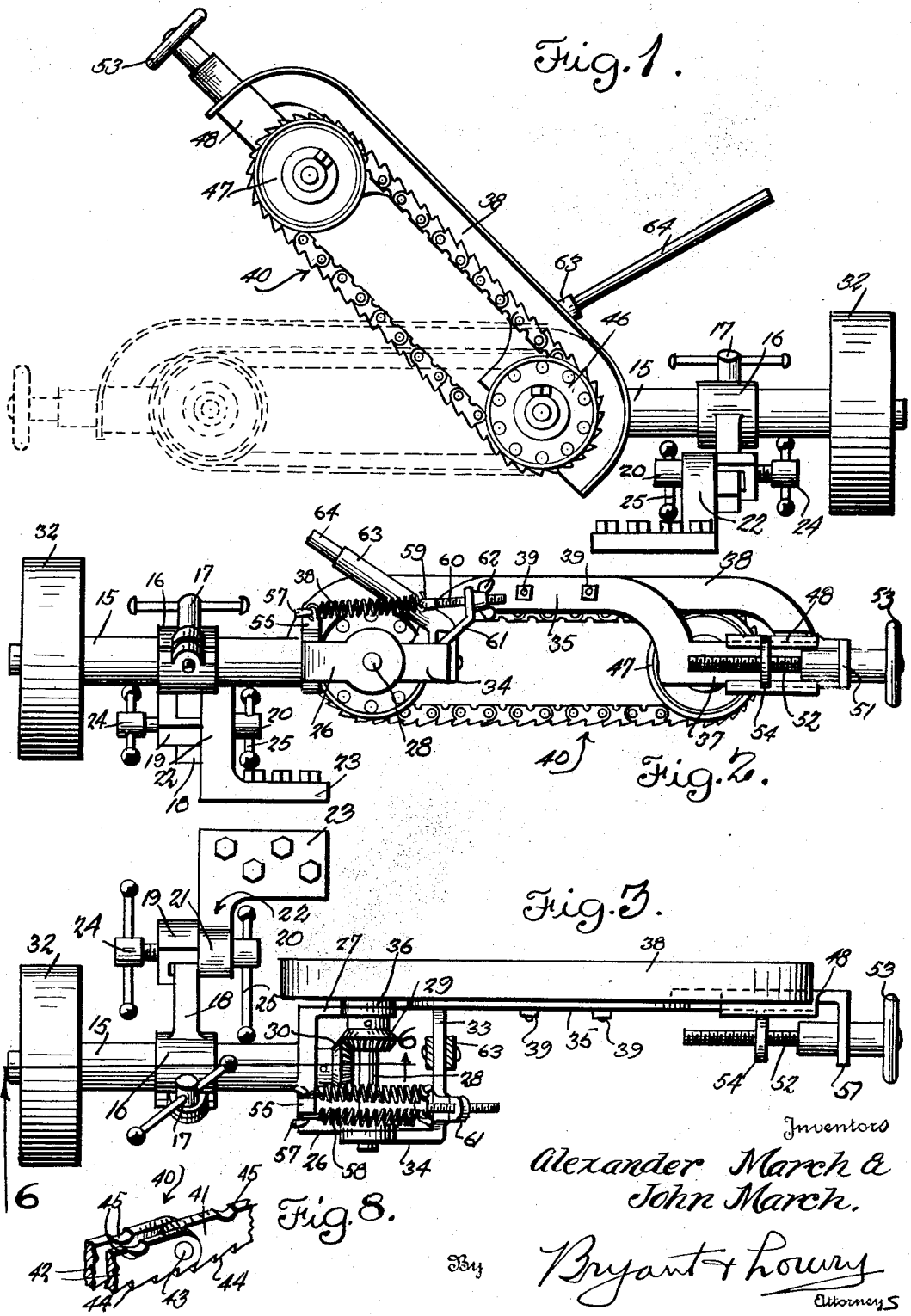

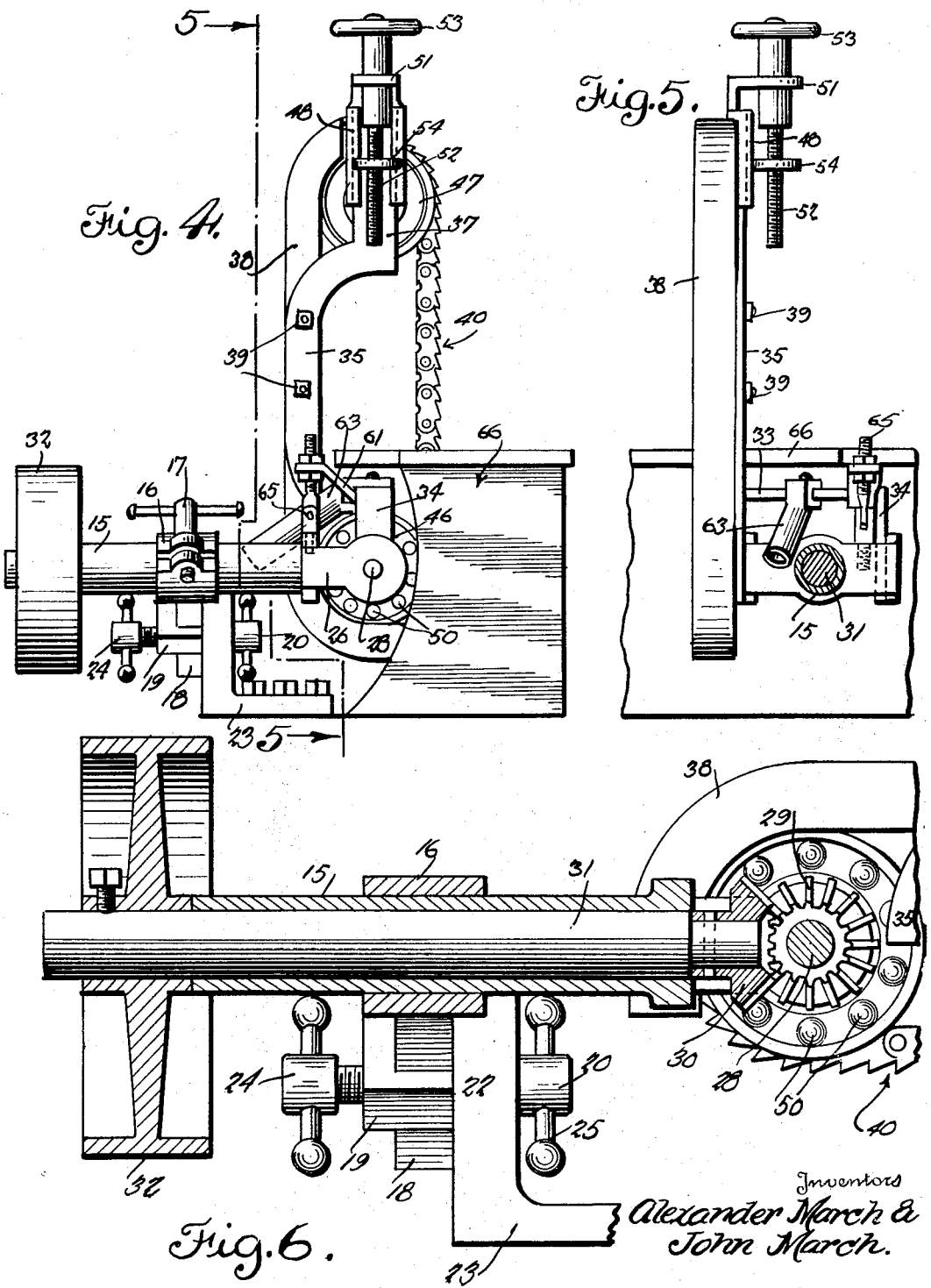

March 27, 1934.　　A. MARCH ET AL　　1,952,270
WOOD SAWING MACHINERY
Filed July 11, 1933　　3 Sheets-Sheet 3

Inventors
Alexander March &
John March.
By Bryant & Lowry
Attorneys

Patented Mar. 27, 1934

1,952,270

UNITED STATES PATENT OFFICE 1,952,270

WOOD-SAWING MACHINERY

Alexander March and John March, Philadelphia, Pa.

Application July 11, 1933, Serial No. 679,954

1 Claim. (Cl. 143—32)

This invention relates to certain new and useful improvements in wood sawing machinery.

The primary object of the invention is to provide wood sawing machinery in the form of a motor operated saw of the endless or band type that is capable of association with a motor tractor to be transported and driven thereby so that the machine may be utilized for the felling of trees.

A further object of the invention is to provide a sawing machine of the foregoing character wherein an endless or band saw is carried by a resiliently supported pivotally mounted frame with the feeding of the saw to the work being manually controlled against spring tension thereon.

A further object of the invention is to provide a sawing machine of the foregoing character wherein the endless or band saw may be perpendicularly positioned and rigidly mounted with a work table associated therewith for use as a band saw, provision being made for angular adjustment of the saw support.

With the above and other objects in view that will become apparent as the nature of the invention is better understood, the same consists in the novel form, combination and arrangement of parts hereinafter more fully described, shown in the accompanying drawings and claimed.

In the drawings:—

Figure 1 is a side elevational view of a wood sawing machine constructed in accordance with the present invention, showing a pivotally mounted frame for the support of an endless or band saw, with the frame and saw illustrated by dotted lines in a lowered position;

Figure 2 is an opposite side elevational view of the sawing machine with the frame and saw carried thereby lowered into horizontal position against spring tension thereof;

Figure 3 is a top plan view of the machine;

Figure 4 is a side elevational view with the saw and supporting frame rigidly retained in perpendicular position for use as a band saw and having a work bench associated therewith;

Figure 5 is a vertical cross-sectional view taken on line 5—5 of Figure 4;

Figure 6 is a longitudinal sectional view taken on line 6—6 of Figure 3, showing the driving devices for the endless or band saw;

Figure 8 is a fragmentary perspective view showing the link construction of saw;

Figure 11:
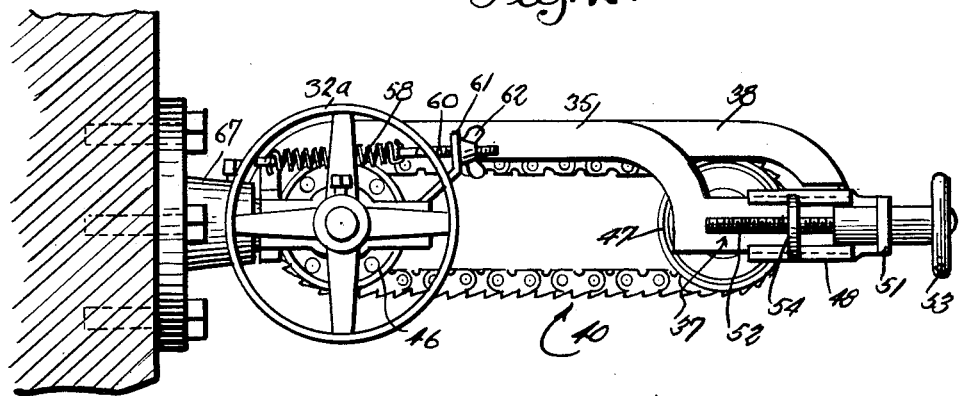
Figure 11 is a side elevational view showing another form of drive for the endless saw.
Figure 12:
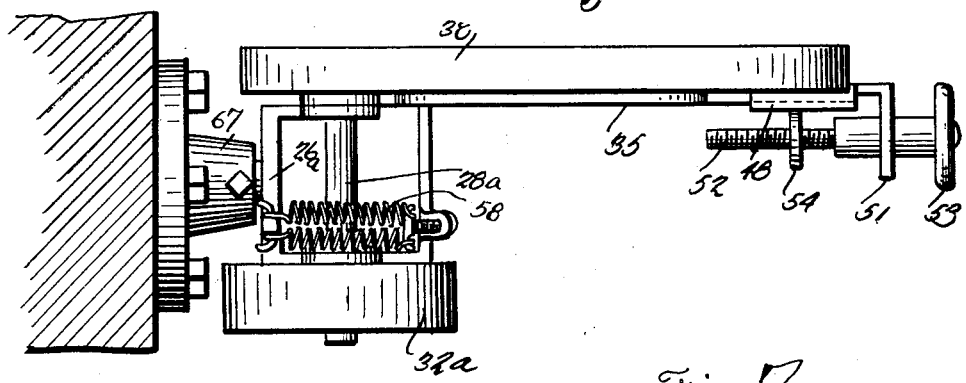
Figure 12 is a top plan view of the direct drive arrangement for the saw shown in Figure 11.
Figure 7:
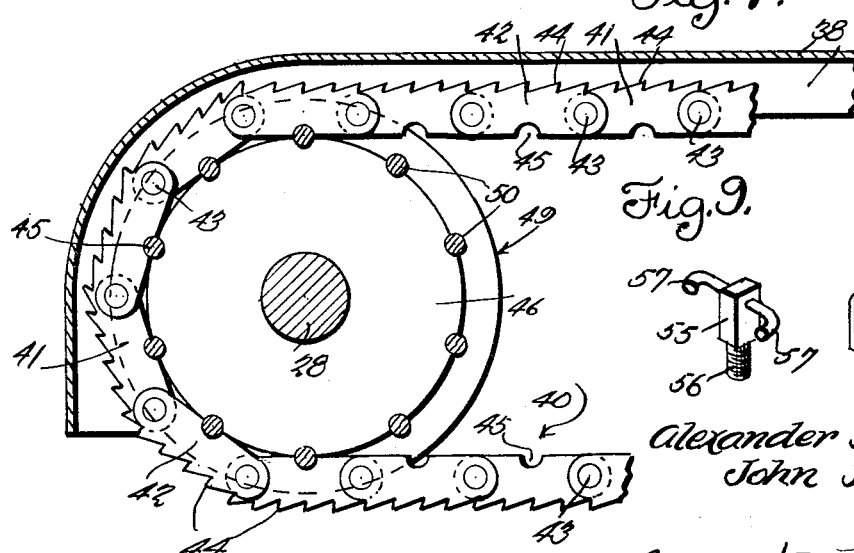
Figure 7 is a fragmentary detail sectional view showing the positive driving connection between the endless saw formed of links and the driven wheel traversed by the saw.

Referring more in detail to the accompanying drawings, and particularly to Figures 1 to 10, there is illustrated a wood sawing machine adapted for various uses, such as the felling of trees, the sawing of logs and wood sawing work in general and said machine may be carried by and have driving connection with a motor tractor. It is also intended that this wood sawing machine be mounted on a stationary support with the endless or band saw perpendicularly postioned to have a work bench associated therewith and used as an ordinary band saw. The frame of the sawing machine comprises a horizontally disposed tubular bearing 15 mounted in a split collar 16 for rotatable adjustment and retention in fixed position in adjusted position by the screw clamp 17, the split collar 16 carrying a laterally projecting leg 18 extending through the apertured head 19 that has a bolt portion 20 extending through the bearing head 21 at the upper end of a bearing arm 22 rising from an anchored base plate 23. The leg 18 is shiftable in the apertured head 19 to vary the elevation of the tubular bearing 15 and is retained in adjusted positions by the clamping screw 24, this adjustment also acting as a belt tightener or slack adjuster in a manner to be presently described, while the arm 25 associated with the bolt 20 permits lateral movement of the tubular bearing 15 in an arcuate path centering on the bolt 20 for the correct positioning of the saw.

A forked head is carried by one end of the tubular bearing 15 and comprises a pair of parallel arms 26 and 27 extending outwardly of the end of the tubular bearing and having a cross shaft 28 journalled therein. A bevel pinion 29 is keyed to the shaft 28 adjacent the arm 27 and meshes with a bevel gear 30 keyed to the shaft 31 that is journalled in the tubular bearing 15, the bevelled pinion and gear 29 and 30 being located within the forked head while the opposite end of the driven shaft 31 extending outwardly of the tubular bearing 15 has a belt pulley 32 keyed thereto.

A supporting frame for a saw and saw guard is pivotally mounted at one end upon the cross-shaft 28 and includes a cross bar 33 having a right angle leg 34 at one end that is pivotally mounted upon the cross-shaft 28 with the other end of the cross-bar 33 carrying an elongated frame bar 35 arched intermediate its ends with one end pivotally mounted as at 36 upon the end of the cross shaft 28 adjacent the arm 27 while the other end thereof carries an arm 37 in the plane of the pivot 36. A saw guard 38 of angle formation in cross-section with curved ends is secured as at 39 to the frame bar 35.

The saw designated in general by the reference character 40 and shown in detail in Figure 8 is formed of a series of single and double links 41 and 42 with the single links pivotally connected as at 43 between adjacent ends of the double links 42, the working edges of the saw having teeth 44 while the rear plain edges of the single and double links are notched as at 45 for positive driving engagement with a mounting and guide wheel therefor.

The saw 40 is of the endless or band type and travels over guide wheels 46 and 47, the wheel 46 being keyed to the cross shaft 28 outwardly of the arm 27 of the forked head and the pivot bearing 36 of the frame bar 35 to be located within the guard 38 while the wheel 47 is journalled on a slide bar 48 carried by the arm 37 of the frame bar 35 and being movable longitudinally of the arm 37 in a manner to be presently described. Each saw guide wheel 46 and 47 includes parallel peripheral flanges 49 providing a circumferential radial groove for the reception of the endless saw 40 with the toothed edge 44 of the saw directed outwardly of the wheels 46 and 47. The base of the circumferential peripheral groove of the wheel 46 is provided with spaced abutments or cross pins 50 for interfitting reception in the notches 45 at the inner edges of the saw links 41 and 42 to effect a positive driving action of the saw. To tighten the links of the endless saw 40, the outer end of the slide bar 48 upon which the wheel 47 is rotatably mounted has an angle extension 51 in which a screw 52 is swiveled and operated by means of the handle 53, the screw 52 working through a lug 54 projecting laterally of the frame bar arm 37.

Figures 9, 10:
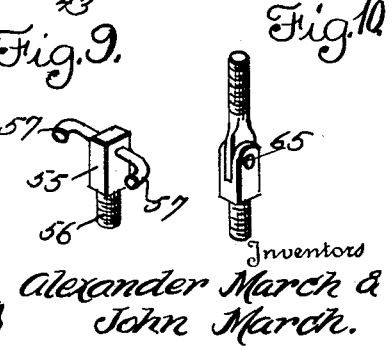
Figure 9 is a detail perspective view of the removable spring engaging device carried by the saw frame when the latter is mounted for tensioned pivotal movement.
Figure 10 is a detail perspective view of the rigid screw connection between the saw frame and saw support to hold the latter perpendicularly positioned.

The frame bar 35 is tensioned in a direction away from work and is adapted to be manually moved on the pivot bearing 36 to swing the frame bar and saw toward the work, the tension devices for normally holding the frame bar and saw in retracted position comprising the block 55 shown in Figures 2, 3 and 9 as carrying a screw 56 at one end thereof for threaded engagement in the base portion of the fork head of the tubular bearing 15 and carrying at its other end a pair of oppositely disposed hooks 57 for engagement with ends of coil springs 58, the other ends of the springs being engaged with hooks 59 upon a screw 60 that passes through a bracket arm 61 carried by the cross bar 33 that is pivoted on the cross shaft 28, the tension of the springs 58 being regulated by the thumb nut 62 threaded on the screw 60 and engaged with the bracket arm 61, these springs acting to hold the outer end of the frame bar in an elevated position with respect to the tubular bearing 15 or away from the work. To move the frame bar and saw toward the work, the cross bar 33 has a socket member 63 secured thereto for the reception of an elongated operating handle 64 acting as a lever for moving the frame bar and saw pivotally upon the cross-shaft 28.

To use the sawing machine for the felling of trees, the tubular bearing 15 is rotated in the strap collar 16 to present opposite runs of the endless saw in horizontal planes and the elevation of the saw may be regulated by shifting the leg 18 in the bearing 19. The saw is fed to a standing tree by moving the same on the cross-shaft 28 which constitutes a pivot therefor. Power is supplied to the pulley 32 and through the meshing gears 28 and 29 the cross shaft 28 is rotated for imparting movement to the endless saw 40. The machine is also used for sawing logs and is positioned for such use as shown in Figures 1 to 3 of the drawings. The opposite runs of the endless saw being in a vertical plane.

When it is desired to use the sawing machine as a band saw, as illustrated in Figures 4 and 5, the tension springs 58, the screw block 55 and the spring tensioning screw 60 are removed, the double ended screws 65 shown in Figure 10 being substituted for these parts. The frame bar 35 is perpendicularly positioned as shown in Figures 4 and 5, the double ended screw 65 engaged with the base portion of the forked head of the tubular bearing 15 and the bracket arm 61 maintaining the frame rigidly positioned. A work table or bench 66 is positioned as shown in Figure 4 so that work may be fed to one run of the saw 40. In addition to true right angle cuts, angular cuts may also be made by adjusting the tubular bearing 15 in the split collar support 16.

From the above detailed description of the invention, it is believed that the construction and operation thereof will at once be apparent, it also being intended to simplify the operating devices for the endless saw as shown in Figures 10 and 11, wherein the forked head 26a is rotatably adjustable in a bearing 67 with the cross-shaft 28a journalled in the arms of the forked head. One end of the shaft 28a has a drive pulley 32a directly engaged therewith and while this form of the invention illustrates the frame supporting bar and associated parts as being tensioned as shown in Figures 1 to 3, it is to be understood that with this direct drive for the cross shaft 28a, the frame bar and saw may be perpendicularly positioned for use as an ordinary band saw. By forming the endless saw of links, it is possible to quickly repair the saw should one or more of the links become broken and with the particular association of the endless saw with the wheels 46 and 47, it is possible to provide a positive drive connection between one of the wheels and the saw. This sawing machine may be bolted upon the frame or platform of a tractor and conveniently transported for work to be driven by the motor of the tractor, or the same may be mounted upon a platform or the like and motor operated.

While there are herein shown and described the preferred embodiments of the invention, it is

We claim:—

In a wood sawing machine, a base plate, a bearing arm rising therefrom, a bearing head at the upper end of the arm, an apertured head carrying a bolt extending through the bearing head, means for holding the bolt in rotatably adjusted positions, a leg adjustably mounted in the apertured head, a split collar carried by the upper end of the leg, a tubular bearing rotatably adjustable in the split collar, a driven shaft journalled in the tubular bearing, a band saw and guide, and operative connections between the driven shaft and band saw.

his
ALEXANDER × MARCH.
     mark
JOHN MARCH.

Mark witnessed by:
C. J. Przybylowski,
John Elnicki.